Aug. 17, 1926.  
D. M. SOLENBERGER  
1,596,691  
PISTON RING  
Filed Dec. 31, 1925

Inventor  
Dean N. Solenberger  
By Whittemore Hulbert Whittemore  
& Belknap  
Attorneys Patented Aug. 17, 1926

1,596,691

UNITED STATES PATENT OFFICE.

DEAN M. SOLENBERGER, OF CLEVELAND, OHIO, ASSIGNOR TO SIMPLEX PISTON RING COMPANY, OF CLEVELAND, OHIO, A CORPORATION OF OHIO.

PISTON RING.

Application filed December 31, 1925. Serial No. 78,675.

The invention relates to sealing rings designed for both axial and radial flexibility and consists in the novel construction as hereinafter set forth.

My improved ring is formed from cast iron or other suitable material which is originally machined or ground to an axial width in excess of that of the ring groove for which it is designed. The ring A is then bored radially at intervals as indicated at B, B' after which it is sawed or otherwise slotted to form parallel series of slots C, C', D, D' intersecting with the bores B, B'. The effect is to form intermediate the slots C and D a series of flexible resilient bars E, one end of each being connected to the portion of the ring on one side of the slots while the other end is connected to the portion of the ring on the opposite side of said slots. Thus, the ring may be compressed axially to fit the groove for which it is designed and will exert a predetermined axial pressure against the side walls of said groove.

It is of great importance that this axial pressure should be limited so as not to interfere with freedom for radial movement of the ring in the groove but it is equally important to prevent collapsing of the ring in the groove. Both conditions are fulfilled with my improved construction as the parallel slots intersecting the radial bores facilitate the forming of spring bars of exactly predetermined width and length. All of such spring bars are of the same length with the exception of those in the opposite end portions of the ring immediately adjacent to the transverse splits F which latter are preferably made slightly shorter. This will compensate for the weakening in axial tension due to the split so that the end portions of the ring will exert the same axial pressure as the intermediate portions thereof.

Figure 1:
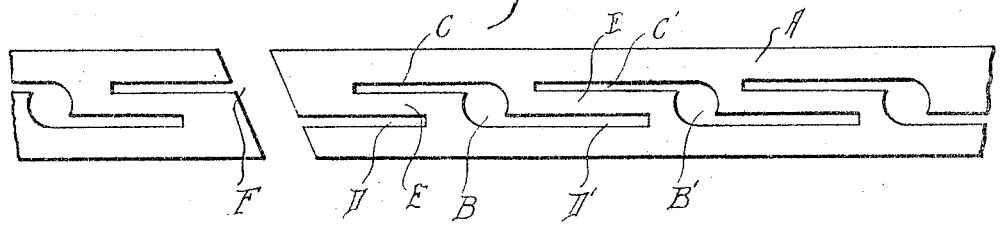
Figure 1 is a diagram indicating a side elevation of the ring as developed in a plane.
Figure 2:
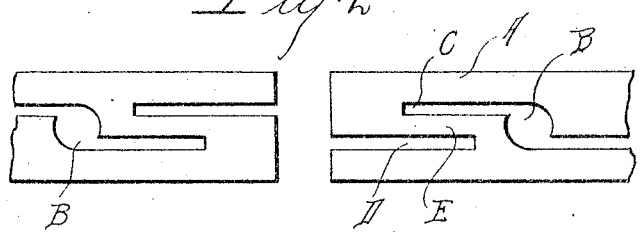
Figure 2 is a similar view of a slightly modified construction.
Figure 3:
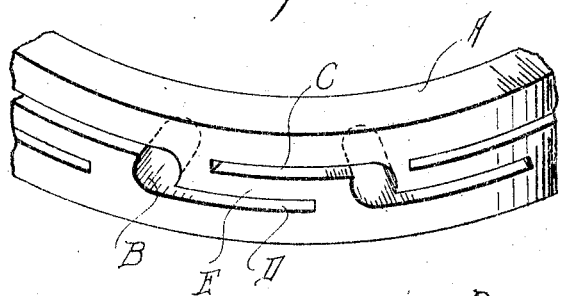
Figure 3 is a perspective view of a portion of the ring.

In the construction shown in Figure 1 the ring is transversely split diagonally. The construction shown in Figure 2 has the split parallel to the axis, otherwise the constructions are the same.

What I claim as my invention is:

1. A sealing ring provided with a plurality of series of circumferentially extending slots in spaced planes, the adjacent ends of slots respectively in the spaced planes being cross connected to impart to the ring axial resilient flexibility.

2. A sealing ring provided with a plurality of series of circumferentially extending slots in spaced planes, portions of the ring between said spaced planes being cut away to connect adjacent ends of slots in the respective planes to impart to the ring axial resilient flexibility.

3. A sealing ring provided with a plurality of series of circumferentially extending slots in spaced planes, said ring being also provided with radial bores for connecting the adjacent ends of slots in the respective planes to impart to the ring axial resilient flexibility.

4. A sealing ring provided with a plurality of series of circumferentially extending slots in spaced planes, said ring being also provided with radial bores for connecting the adjacent ends of slots in the respective series and forming between said slots a series of resiliently flexible bars, the bars in the portion of the ring on opposite sides of the split being slightly shorter than those of the intermediate portions.

In testimony whereof I affix my signature.

DEAN M. SOLENBERGER.